United States Patent
Atwater et al.

(10) Patent No.: US 12,061,715 B2
(45) Date of Patent: Aug. 13, 2024

(54) PROCESSING DATA AND PROGRAMS WITH MUTUAL SECURITY TO THE DATA AND PROGRAMS

(71) Applicant: X Development LLC, Mountain View, CA (US)

(72) Inventors: Joel Fraser Atwater, Danville, CA (US); Peter Light, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 29 days.

(21) Appl. No.: 17/585,878

(22) Filed: Jan. 27, 2022

(65) Prior Publication Data

US 2022/0156401 A1    May 19, 2022

Related U.S. Application Data (63) Continuation of application No. 16/592,857, filed on Oct. 4, 2019, now Pat. No. 11,270,019.

(51) Int. Cl.
| | |
|---|---|
| *G06F 21/00* | (2013.01) |
| *G01D 4/00* | (2006.01) |

(Continued)

(52) U.S. Cl.
CPC .......... *G06F 21/6227* (2013.01); *G01D 4/00* (2013.01); *G06F 21/629* (2013.01); *G06Q 50/06* (2013.01)

(58) Field of Classification Search
None
See application file for complete search history.

(56) References Cited

U.S. PATENT DOCUMENTS 5,715,390 A * 2/1998 Hoffman ............ G01R 21/1333
   713/181
6,000,034 A * 12/1999 Lightbody ............. G06Q 50/06
   726/21

(Continued)

FOREIGN PATENT DOCUMENTS

| GB | 2463156 | 3/2010 |
| WO | WO 2012/004597 | 1/2012 |

OTHER PUBLICATIONS

International Preliminary Report on Patentability International Appln. No. PCT/US2020/053907, dated Apr. 5, 2022, 6 pages.

(Continued)

*Primary Examiner* — Maung T Lwin
(74) *Attorney, Agent, or Firm* — Fish & Richardson P.C.

(57) ABSTRACT

Methods, systems, and apparatus, including computer programs encoded on computer storage media, for processing confidential data and confidential programs while providing mutual security to the data and programs. A method includes receiving, from a first system, customer energy data, including data representing energy consumption by a customer; receiving, from a second system, program data representing one or more programs for processing the customer energy data; executing the programs with the customer energy data as input to produce output that includes estimated energy consumption data, while providing security for the program data from access by the first system and any third party and while providing security for the customer energy data and the estimated energy consumption data from access by the second system and any third party; and providing the estimated energy consumption data as output (i) to the first system or (ii) to the customer or (iii) both.

22 Claims, 2 Drawing Sheets

(51) Int. Cl.
*G06F 21/62* (2013.01)
*G06Q 50/06* (2012.01)

(56) References Cited

U.S. PATENT DOCUMENTS

| | | | |
|---|---|---|---|
| 7,707,118 B2 | 4/2010 | James | |
| 7,860,702 B1 | 12/2010 | Evans et al. | |
| 7,904,382 B2 | 3/2011 | Arfin | |
| 8,671,037 B2 * | 3/2014 | Hart, Jr. | G06Q 40/12 |
| | | | 705/29 |
| 8,712,920 B2 | 4/2014 | Walker et al. | |
| 8,832,268 B1 * | 9/2014 | Chheda | H04L 43/0817 |
| | | | 709/224 |
| 10,359,298 B2 * | 7/2019 | Quady | G01D 4/002 |
| 11,610,275 B1 * | 3/2023 | Martinez | G06Q 50/06 |
| 2003/0023540 A2 * | 1/2003 | Johnson | G06Q 30/00 |
| | | | 705/37 |
| 2003/0076242 A1 | 4/2003 | Burns et al. | |
| 2005/0091335 A1 | 4/2005 | Tapia et al. | |
| 2009/0062970 A1 | 3/2009 | Forbes et al. | |
| 2009/0112767 A1 | 4/2009 | Hammad et al. | |
| 2011/0119748 A1 | 5/2011 | Edwards et al. | |
| 2011/0296169 A1 | 12/2011 | Palmer | |
| 2012/0166616 A1 * | 6/2012 | Meehan | G06Q 50/06 |
| | | | 709/224 |
| 2013/0144747 A1 | 6/2013 | Lee et al. | |
| 2013/0275736 A1 | 10/2013 | Kelley et al. | |
| 2016/0162706 A1 | 6/2016 | Fannulari et al. | |
| 2016/0335730 A1 * | 11/2016 | Loeb | G06Q 50/06 |
| 2018/0114029 A1 * | 4/2018 | Roesler | H04W 12/04 |
| 2018/0308104 A1 * | 10/2018 | Tran | G06Q 30/0224 |
| 2019/0123580 A1 * | 4/2019 | Bindea | G05B 13/026 |

OTHER PUBLICATIONS

PCT International Search Report and Written Opinion in International Appln. No. PCT/US2020/053907, dated Nov. 26, 2020, 13 pages.

* cited by examiner

Receive, from a first system, customer energy data, including data representing energy consumption by a customer
202

Receive, from a second system, program data representing one or more programs for processing the customer energy data
204

Execute the one or more programs with the customer energy data as input to produce output comprising forecasted energy consumption data while providing security for the program data from access by the first system and any third party and while providing security for the customer energy data and the forecasted energy consumption data from access by the second system and any third party
206

Provide the forecasted energy consumption data as output to the first system or providing the forecasted energy consumption data relating solely to the customer to the customer or both
208

FIG. 2

PROCESSING DATA AND PROGRAMS WITH MUTUAL SECURITY TO THE DATA AND PROGRAMS

CROSS-REFERENCE TO RELATED APPLICATION

This application is a continuation of U.S. application Ser. No. 16/592,857, filed Oct. 4, 2019, the contents of which are incorporated by reference herein.

BACKGROUND

This specification generally relates to processing confidential information with confidential methods while protecting the confidentiality of both the information and the methods.

The problem of processing confidential data in a way that does not disclose the data, even when it is processed by programs that may not be trusted, may arise in a variety of circumstances.

This specification describes a solution to the problem in the particular context of one of the circumstances in which it arises, namely, the processing electrical utility customer data by a third-party vendor for the purpose of determining whether products or services of the vendor would be advantageous to the customer.

The problem arises because, in general, energy procurement officers, or others responsible for managing energy costs, especially at energy retailers, receive many intervention proposals from disparate providers and consultants. It is difficult for retailers to decipher the effects these proposals would have on their business.

There are three parties involved: ratepayers, i.e., consumers of electricity, retailers, who buy or generate wholesale electricity and sell it to the ratepayers, and vendors, who produce equipment or services. Vendors propose interventions using equipment or services that are intended to modify a ratepayer's energy usage pattern as seen by the retailer, which determines what the ratepayer pays. A modification can have financial and operational effects for both the ratepayer and the retailer. Generally, only a small fraction of ratepayers are suitable candidates for any particular intervention, whose value is a function of their energy usage pattern.

Energy consumption data of any customer is generally confidential to that customer, and a retailer is not free to make the information public. Therefore, vendors have difficulty in finding ratepayers that would benefit from using their products or services, because the vendor is not able to search ratepayers' energy usage patterns to find suitable customers for the vendors' interventions. Additionally, the retailers may not be motivated to provide energy consumption pattern data to vendors, because vendor devices or services will ultimately cost the retailer more money while only benefitting the ratepayer.

Similarly, a retailer may benefit from having ratepayers adopt interventions that would be advantageous to them to take advantage of rate schedules created to motivate ratepayers to adopt usage patterns that satisfy goals of the retailer. However, vendors in general are reluctant to share their confidential pricing and technical information, which they use to determine the cost of the interventions they offer, because that information may give them a competitive advantage over other vendors.

SUMMARY

This specification describes technologies for providing secure processing of a ratepayer's data by a vendor's program, and more generally, for providing secure processing of a first party's confidential data by a second party's confidential program, in a way that protects both the data and the program and still allows some results of the processing to be shared.

In general, one innovative aspect of the subject matter described in this specification can be embodied in methods that include the actions of receiving, from a first system, customer energy data, including data representing energy consumption by a customer; receiving, from a second system, program data representing one or more programs for processing the customer energy data; executing the one or more programs with the customer energy data as input to produce output that includes estimated energy consumption data while providing security for the program data from access by the first system and any third party and while providing security for the customer energy data and the estimated energy consumption data from access by the second system and any third party; and providing the estimated energy consumption data as output (i) to the first system or (ii) to the customer or (iii) both.

Other embodiments of this aspect include corresponding computer systems, apparatus, and computer programs recorded on one or more computer storage devices, each configured to perform the actions of the methods.

The subject matter described in this specification can be implemented in particular embodiments so as to realize one or more of the following advantages. Ratepayers can be introduced to vendors who are likely to have advantageous interventions without compromising the confidentiality of the ratepayers' data. Similarly, vendors can be introduced to ratepayers. Retailers can bring vendor interventions to ratepayers' attention without compromising the ratepayers' or the vendors' confidential information. This can benefit the retailers by the need for capital investments and other expenses. This can benefit ratepayers without hurting the retailer.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes a secure execution system. At a high level, the system is one in which two or more parties can share data and programs, and has the following properties: (i) the programs are run over the data to generate program output; (ii) the data is not accessible to parties other than the original data provider and entities approved by the data provider; (iii) the programs are not accessible to other parties, potentially even to the operator of the system; and (iv) program output generated by the programs is not accessible except to select parties, which may not include the program provider.

The system has interfaces through which data providers, e.g., retailers, can place their data into a secure repository so as to make it available for processing in a controlled way and to allow the value of the data to be realized without compromising its confidentiality. Similarly, the system has interfaces through which program providers, e.g., vendors, can provide programs for execution to process other parties' data. For example, securely held data from Party A and programs from Party B can interact, such that Party A can see the results of their data run through Party B's programs, without either party seeing the other's information. Thus, the system can load data, load programs, and execute the programs while controlling communications by the programs outside the system.

The system also has setup functions—programmatic, interactive, or both—by which a program provider can specify a program flow and linking between program components provided by the provider and other program components, e.g., libraries and databases provided by the system or third parties. The setup functions also enable a provider to specify the formats of the data and metadata required by the provider's programs and the formats of the data output by the programs. The setup functions also enable a provider to specify a secure protocol for transmitting and a public encryption key, for cases in which a data source requires encryption into the programs.

The system has corresponding setup functions—programmatic, interactive, or both—by which a data provider can specify the format and nature of the data and metadata the provider is providing. The setup functions also allow the data provider to specify which vendor's programs can have access to the data and how and to what destination the output of programs must be communicated.

Alternatively, or in addition, the system has administrative setup functions—programmatic, interactive, or both—by which a system administrator can specify which parties can communicate with the system and how and to what destination the output of processing must be communicated.

The administrative setup functions also allow an administrator to specify and provide interfaces supporting protocols for sending private information into the system and obtaining program outputs from of the system.

Protecting the Programs

The system runs provided programs in virtual machines or other secure execution environment instances, e.g., containers or sandboxes.

To reduce the risk that programs or their algorithms will be exposed to unauthorized disclosure from reverse engineering or otherwise, implementations of the system include one or more of the following features. The system enforces limitations specified by a program provider that specify which data sources will be permitted to have their data processed by the programs of the data provider. Programs are stored on the system in encrypted form and decrypted only into memory of execution environments when the programs are to be executed. Access to programs is limited by access control lists controlled by the respective program providers.

In addition, program providers can protect their programs by limiting the amount of information provided to data sources or others by the programs, to limit the ability of third parties to reverse engineer algorithms implemented by the programs.

Optionally, the system can execute programs in a secure execution environment that uses hardware-supported trusted execution environments of a CPU (central processing unit) or a secure element microprocessor for the protection of programs.

Protecting the Confidential Data

As noted above, the system runs provided programs in virtual machines or other secure execution environment instances, e.g., containers or sandboxes. These instances are configured to have limited access to data, communications, and storage, other than what is specifically provided in order to support the processing of the confidential data. Specifically, to make the instances secure, the system limits the ability of the secure execution environment instances to store and communicate data.

To reduce the risk that programs will intentionally or inadvertently disclose confidential data provided by data sources, implementations of the system include one or more of the following data protection features. The system enforces limitations specified by a data source as to the program providers whose programs are permitted to process the confidential data of the data source. However, a data source may permit its data is to be processed by any programs in secure execution environments of the system. The system prevents secure execution environments, when they are processing confidential data, from sending communications to any entity other than the data source of the confidential data, except as may be explicitly permitted by the data source. The system allows output from a program to be sent only through a secure communication channel provided by the system, which will only send it to the data source or an entity specified by the data source.

One or more of the following further data protection features may also be included. The system enables a data source to provide its data in encrypted form, to be decrypted either by the system or by secure execution environments in which the data is to be processed. In either case, either the system or the respective program providers may publish a public key for data sources to use in encrypting their data. Optionally, the system may allow a data source to require that data be delivered in encrypted form to the secure execution environment instances that will process the data, so that even if it is stored by the system, it is stored in encrypted form. Similarly, the system may allow a data source to require that output be delivered in encrypted form from the secure execution environment instances to the data source.

The system can also optionally prevent the secure execution environments from storing any data in non-volatile memory, in order to protect the data. The system can do this, for example, by configuring the secure execution environments with no access to non-volatile storage.

The system can optionally require that programs are provided in a pre-determined form so that operation of the programs can be limited by the system to exclude actions that would risk leaking confidential data. For example, the system can optionally require that programs be code for a particular virtual machine, e.g., a Java Virtual Machine, and deploy the programs into secure execution environments that are configured with virtual machines that are limited in the operations they can perform to ones that are considered safe. More specifically, for systems that are intended to perform programs with specific pre-determined functionality, the system can be configured with secure execution environments that support a domain specific language designed for such programs, and required that programs provided for execution be coded in that language. Alternatively, the system can deploy programs in any form in sandbox environments that are configured with controlled access to communication and storage facilities to limit the risk that programs will leak confidential data.

Batching and Parallelizing

In some implementations, the system can receive input from the program provider requesting that the system run particular programs in multiple execution environment instances. How many instances the system provides will depend on the resources available. The provider may do this if the programs are not multithreaded in order to realize increased throughput through parallel processing. A provider may do this even for multithreaded programs if a large amount of input data is expected. The provider can further specify whether the outputs from the multiple instances are to be combined by the system for delivery to the data source or other specified recipient, or whether each instance is to deliver its output as if it were the only instance.

To support a requested parallel execution of program instances, the system implements one or more of the following features. The system in some implementations can shard input data from a source into a number of shards corresponding to the number of execution instances and provide a shard of data to each instance. To enable the system to do this, the data source provides a data specifying, e.g., in metadata or programmatic form, where the input data can be separated into shards. In addition or alternatively, the system can set a maximum size for a unit of data, which units can be assembled by the system into shards or even a single input, so that the input data can be processed by any number of instances. An advantage of both approaches is that the sharding of data can be done successfully with data that is encrypted, which would prevent the system from parsing the data to identify points at which the data could be separated without compromising its integrity.

In some cases, the system is dedicated to programs processing data in a particular form, e.g., the electric power consumption data of particular use cases described in this specification. In such cases, the structure of all the input data can be specified, and if it is, the system can use a single method for sharding any input data for parallel processing.

Support of Development and Testing

To support testing by program providers, the system allows program providers or others to provide test data that is similar to real data but is not sensitive, and to identify it as test data to the system, e.g., using a setup function or system interface.

When a provider's programs are running on such identified test data, the system opens a channel of communication between the programs and the provider that allows the running programs to communicate with the provider to allow the provider to test and debug its programs. Otherwise, the operation of the system is the same for the test scenario as for the processing of confidential data.

Electric Power Consumption Intervention Use Case

Particular implementations of the system support use cases in which a vendor has programs that can evaluate the suitability of interventions offered by the vendor for electric utility ratepayers, in terms of the savings that could be realized by the ratepayers' adopting the interventions. In these use cases, the retailer generally has an obligation to maintain the confidentiality of the ratepayers' consumption data, and the vendor generally wants to protect the confidentiality of the algorithms implemented in the vendor's programs. Interventions offered by vendors are generally products or services or both that change the consumption pattern as seen by the retailer, resulting in lower bills to the ratepayer. This may result, for example, from changes to energy consuming equipment used by the ratepayer, or the addition of equipment to time shift the load from times of more expensive rates to times of less expensive rates.

For the use cases of electric power consumption data and intervention evaluation, the unit of information sent into the system is historical energy usage time series data for a single ratepayer along with metadata about that ratepayer including the tariff schedule applicable to the ratepayer; and the information provided as output by the vendor's programs is an estimated economic impact to the ratepayer of adopting one or more proposed interventions, either in reference to present or historical energy consumption. To protect its algorithms, the vendor programs may provide more or less information, ranging from a very general statement that an intervention is or is not projected to be advantageous to a detailed comparison of past and projected meter readings and billings.

In such implementations, a suite of analysis services are generally made available to the system. One such standard service is a rate engine service that estimates a customer's bill from actual or hypothetical, e.g., forecasted, meter readings.

Figure 1:
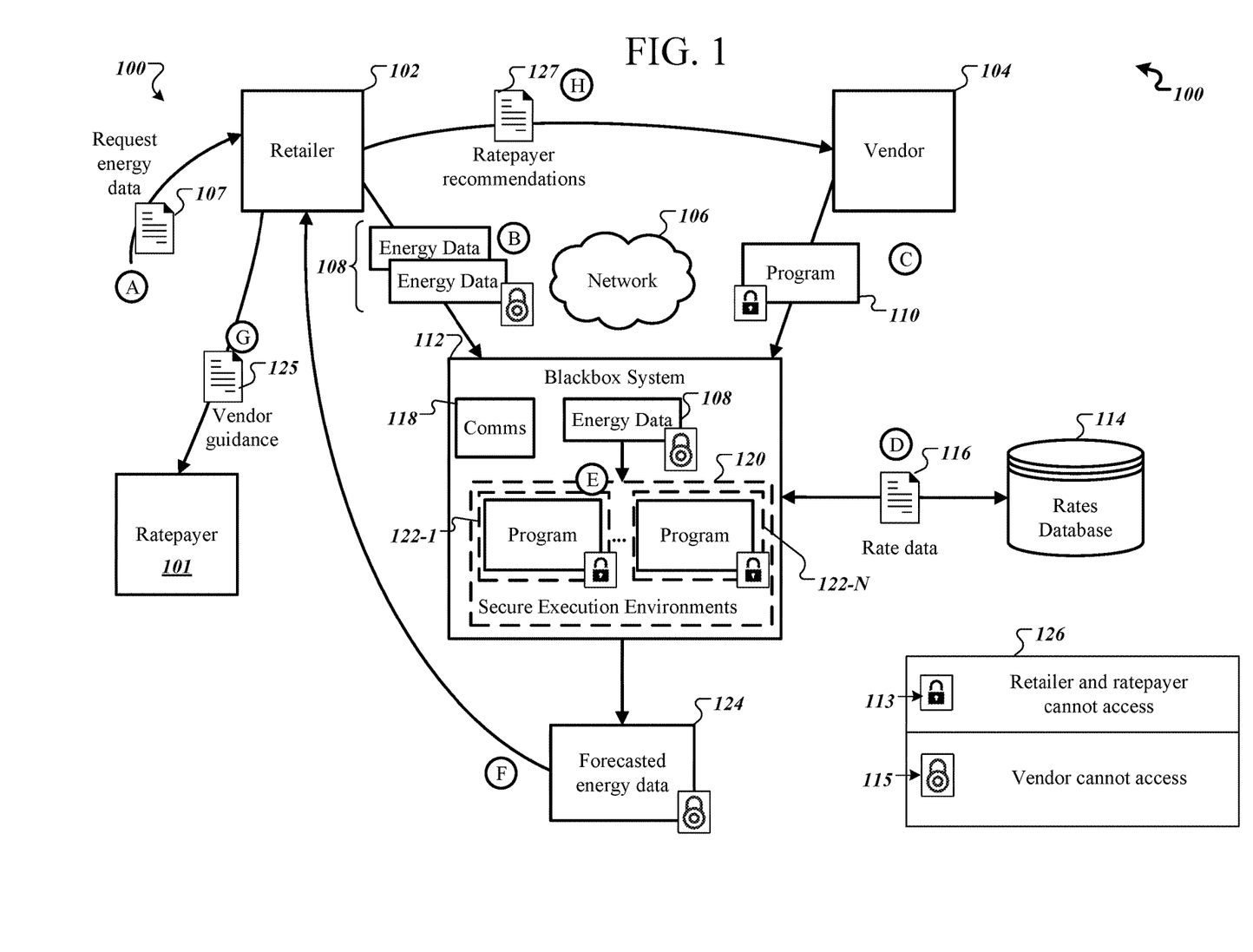
FIG. 1 is a block diagram that illustrates an example of a use case in which a system processes data while providing mutual security to data and programs.

FIG. 1 is a block diagram that illustrates an example use case 100 in which a secure execution system 112 processes data while providing mutual security to data and programs. This system may be referred to as a "blackbox system." The system may implemented on one or more computers connected over a network. This example is a particular use case in which confidential utility ratepayer information is processed by confidential vendor programs while protecting both the information and the programs.

The use case 100 includes a ratepayer 101, a retailer 102, a vendor 104, a rates database 114, and the blackbox system 112. Each of these components can communicate with one another, e.g., over a data communication network 106. In general, such a use case includes more than one ratepayer, more than one retailer, and more than one vendor that communicate with one another. FIG. 1 illustrates various operations in stages (A) to (H), which can be performed in the sequence indicated or in another sequence.

As illustrated in FIG. 1, the system is a secure execution system that can receive from two or more parties their respective data and programs, and securely produce a result by executing one or more of the programs to process some or all of the data, without disclosing the data or the programs to others.

A ratepayer is a customer who purchases and consumes electricity received from a retailer. A retailer is generally a utility company that purchases or generates electricity to sell to ratepayers. The vendor is generally a third party, i.e., a party not affiliated with either the ratepayer or the retailer, that provides equipment or services or both to ratepayers that are intended to reduce the cost of electricity to the ratepayers. Such equipment, services, or combinations of them are referred to as "interventions."

The vendors' programs generate results that indicate which interventions provided by the vendors may fit the ratepayers' needs.

The system can include one or more communication subsystems 118 that for use by the system and programs to communicate with external parties. For example, the communication subsystems can receive sensitive data from the retailer and sensitive programs from the vendor. The system can also transmit data to the external parties using the communication subsystems. In some implementations, the receiver system receives sensitive information from the parties locally or over a secure protocol. For example, the protocol can be a secure shell protocol (SSH) file transfer protocol, secure file transfer protocol (SFTP), or other network transfer protocol.

The rates database can include rate schedules for one or more retailers. The rates schedules can include rates that apply to the consumption of electricity by the ratepayer. The system makes the rates database accessible by vendor programs.

As noted above, FIG. 1 shows a series of stages in a scenario of a system 112 receiving energy consumption data 108 from a retailer and a vendor program 110 from a vendor. The system is an implementation of the secure execution system described above. The system provides the energy consumption data as input to the vendor program. The system executes the vendor program securely to produces results, which the system provides the results to the retailer or the ratepayer. The execution is secure because the system prevents the vendor from accessing the data provided by the retailer and prevents the retailer and the ratepayer from accessing the data provided by the vendor.

During stage (A), the retailer receives a request 107 for ratepayer energy consumption data to be processed by one or more vendors to identify ratepayers who would benefit from interventions, i.e., equipment or services or both, that are offered by the vendors. The request may come from a ratepayer or from a vendor, or it may be generated by the retailer itself.

If the request comes from a ratepayer, the request may optionally specify particular vendors or kinds of vendors, i.e., kinds of equipment or services, the ratepayer is interested in, and the retailer will include that information with the energy consumption data. If the request comes from a vendor, the request may optionally include a profile of ratepayers for which the vendor is interested in getting data; and the retailer will provide the data for such ratepayers. If the request is internally generated by the retailer itself, the retailer may provide data for those ratepayers that the retailer has determined are most likely to benefit from particular vendors' products or services, and specify which vendors should be given the data to process. The retailer may send such data periodically.

The retailer can receive various requests from multiple ratepayers and provide each request and the corresponding energy consumption data to the system.

During stage (B), the system receives energy consumption data from the retailer. For example, the energy consumption data includes data describing how much energy a ratepayer or multiple ratepayers consumed over specific periods of time.

The energy consumption data describes how a ratepayer has consumed electricity, e.g., it can include all the data provided by a smart meter or smart appliances or both, and in particular the patterns of consumption over specific periods of time. In particular, the energy consumption data can indicate an amount of electricity consumed by various smart appliances of the ratepayer.

During stage (C), the system receives a program from a vendor, for example, over a data communication network. The system can receive vendor programs before the system has any data to run them on. When the system receives data from retailers that data can include metadata specifying which vendors program or programs should process the data. Alternatively, in some cases, the data from the retailers can be received before the corresponding vendor programs are received, in which case the system can optionally be configured to notify the vendor that data for a particular vendor program or programs is available for processing.

With the vendor program, the vendor can optionally include one or more configuration options for processing energy consumption data. For example, the vendor program can instruct the system to route the output results to the ratepayer, the retailer, or both. The vendor program can also indicate specific configuration parameters specifying to the system what resources the vendor wants to have for executing the program. For example, the system can receive configuration options specifying a number of GPUs to execute the program, a number of CPUs or a number of cores, or an amount of memory for a virtual machine to execute the program.

The vendor program computes estimated energy consumption and cost data, and optionally other energy-related data, based on various what-if scenarios, which scenarios will generally include the addition of one or more devices or services or both, provided by the vendor. The estimated data can be an estimate for a future time in which the energy requirements of the ratepayer are the same as present or average present requirements, or the estimated data can represent an estimate of consumption and cost that would have occurred at a past time or time period for which the vendor program has ratepayer data, e.g., a past season, e.g., last winter. The times or time periods can be specified by the vendor as a program parameter or optionally by a ratepayer request.

In general, the estimated energy consumption and cost data describes how a ratepayer's energy consumption, as seen by and billed by the retailer, would change, or would have changed, as a result of adopting a posited intervention offered by a vendor. In particular, by calculating the effects of a use of the vendor's equipment instead of or in addition to the ratepayer's current equipment, a vendor program can estimate that the ratepayer would draw less energy from the retailer or draw energy at a lower price. The estimated data can optionally include data representing energy use patterns of particular kinds of equipment that are present or that may be added to a ratepayer's facilities. In one what-if scenario, the vendor program can determine the effect of an installation of batteries and solar panels. In other what-if scenarios, the vendor program can determine the effect of an installation of HVAC systems, insulation, lighting components, washer and dryer, oven, dishwasher, entertainment components, and computers made and sold by the vendor, to name a few examples. The vendor programs estimate energy consumption and cost data using data that describes the energy consumption consequences of adopting the intervention posited by each what-if scenario in place of or in addition what the retailer already has.

In stage (D), the system receives rates data 116 from the rates database. This may be received locally or over a network. The rates data retrieved from the rates database can include a rate schedule offered by the retailer.

Once the system has the energy consumption data, the vendor program, and the applicable rate schedule or schedules from the rates database, the system can instantiate secure execution environments to run the program. In some implementations, the system selects the amount of resources provided to the program based on the amount of energy consumption data provided by the retailer and the requirements of the program as disclosed by the vendor. In other implementations, the system allows vendors to specify resources for their programs to execute. For example, a vendor can specify that its programs execute in an environment that supports multithreading.

During stage (E), the system provides the energy consumption data to the program in one or more secure execution environments 120 provided by the system that are specially configured to run a vendor program while protecting the confidentiality of the data. For example, the system can deploy instances of the program to execute in N secure execution environments 122-1 . . . 122-N. The system provides a respective part of the energy consumption data as input to each instance of the program. The system optionally combines the output from the vendor program instances to deliver as requested to the retailer or, keeping the ratepayers' results separate, to the ratepayers.

The system prevents the vendor program from communicating with external systems, including the vendor's own systems, as described above. In particular, the system provides no connections for the vendor program to the Internet or other external networks from the secure execution environments. The system allows output from the vendor program to be sent only through a secure communication channel, which will only send it to the ratepayer or the retailer. In some implementations, the system can provide a respective ratepayer-specific output to each of multiple ratepayers when the input energy consumption data includes data for multiple ratepayers. For example, when the input energy consumption data includes data for multiple ratepayers, the retailer also provides identification data with the input energy consumption data so the system can distinguish and identify energy consumption data for a particular ratepayer. The system can use the identification data to provide the ratepayer data one ratepayer at a time to a secure execution environment and to send the output of the secure execution environment to that ratepayer, ensuring the output is only provided to the ratepayer indicated by the identification data. Alternatively, the system provides the program output to the retailer with an indication of which ratepayer the output data belongs, for the retailer to provide the output to the ratepayer. Additionally, in order to prevent confidential data leaking outside the system, the system prevents instances of vendor programs in each virtual machine from communicating with one another. Thus, during the system's execution of the vendor program, the system protects confidential data by preventing the vendor programs from communicating with other components or services internal or external to the system except as explicitly permitted.

The system can match energy consumption data or a subset of the energy consumption data from a particular retailer to a particular vendor program for processing. The system can receive, from the vendor, data describing various programs recommended for particular retailers. The vendor may provide programs to the system specifying that the programs are only for a particular retailer or a group of retailers.

In addition to receiving the energy consumption data from the retailer, the system may also receive metadata about the energy consumption data. The metadata includes a size of the energy consumption data and customer characteristics. In some implementations, the system allows the vendor to tell the retailer how much data that the vendor would like to process, and in response, the system receives that amount of energy consumption data for processing.

In some implementations, the vendor or the system can request that the retailer divide the energy consumption data into batches each holding the data of one or optionally more than one ratepayer and each being limited to a specified size, if possible.

During stage (F), the system provides the program output 124 generated by the vendor program for each of one or more scenarios evaluated by the program, including data identifying the scenarios and, if multiple ratepayers' data was processed, data matching the outputs to the ratepayers. The output data can include as much or as little information as the vendor decides to provide, in order to protect the vendor's algorithms from reverse engineering.

If the retailer provides ratepayer contact information, e.g., e-mail or postal mailing addresses, with the ratepayer data, and permits the system to send output directly to the ratepayer corresponding to input data, the retailer may decide to provide more information in the output, as it is only going to one recipient and only for one set of input data. If the retailer provides only identifiers for the ratepayers that do not permit programs or vendors to map the data to particular ratepayers, the programs may be configured to output less information, because the information will have to be forwarded to the ratepayers by the retailer.

A program can provide as little information as an indication that a particular intervention would be advantageous for a particular ratepayer. A program could provide more information, including one or more of projected patterns of energy usage from the retailer, projected costs, projected savings, project return on investment, project cash flows, and projected billings for each of the intervention scenarios evaluated by the program. As permitted by the retailer, which is responsible for the confidentiality of the ratepayers' data, the output can be provided through the retailer, or the retailer can permit the system to permit the program to send the output relating to a ratepayer directly to the ratepayer.

During stage (G), if the retailer receives the program output for a ratepayer, the retailer can provide to the ratepayer the data and vendor information 125 that the data applies to. For example, the vendor information can include a name of the vendor, contact information of the vendor, and whatever estimated energy consumption and cost data the program provided. The retailer can provide this information to the ratepayer electronically.

During stage (H), in addition to the retailer providing the vendor information to the ratepayer, the retailer may provide ratepayer information 127 to the vendor, with the ratepayers' permission, for ratepayers identified by a vendor program as being good candidates for the vendor's interventions. For example, the ratepayer information can include names and contact information of the ratepayers, and data describing which scenarios seem advantageous to the respective ratepayers.

As has just been described, the system implements a number of features to ensure the vendor cannot access the energy consumption data, and likewise, the retailer cannot access the vendor programs. This is summarized in FIG. 1, where legend 126 illustrates items that the retailer, the ratepayer, and the vendor cannot access. Legend 126 illustrates a first lock 113, which represents data, e.g., vendor program within virtual machines 122, that the retailer and the ratepayer cannot access. Additionally, legend 126 illustrates a second lock 115, which represents data, e.g., energy consumption data and estimated energy consumption and cost data, the vendor cannot access.

Figure 2:
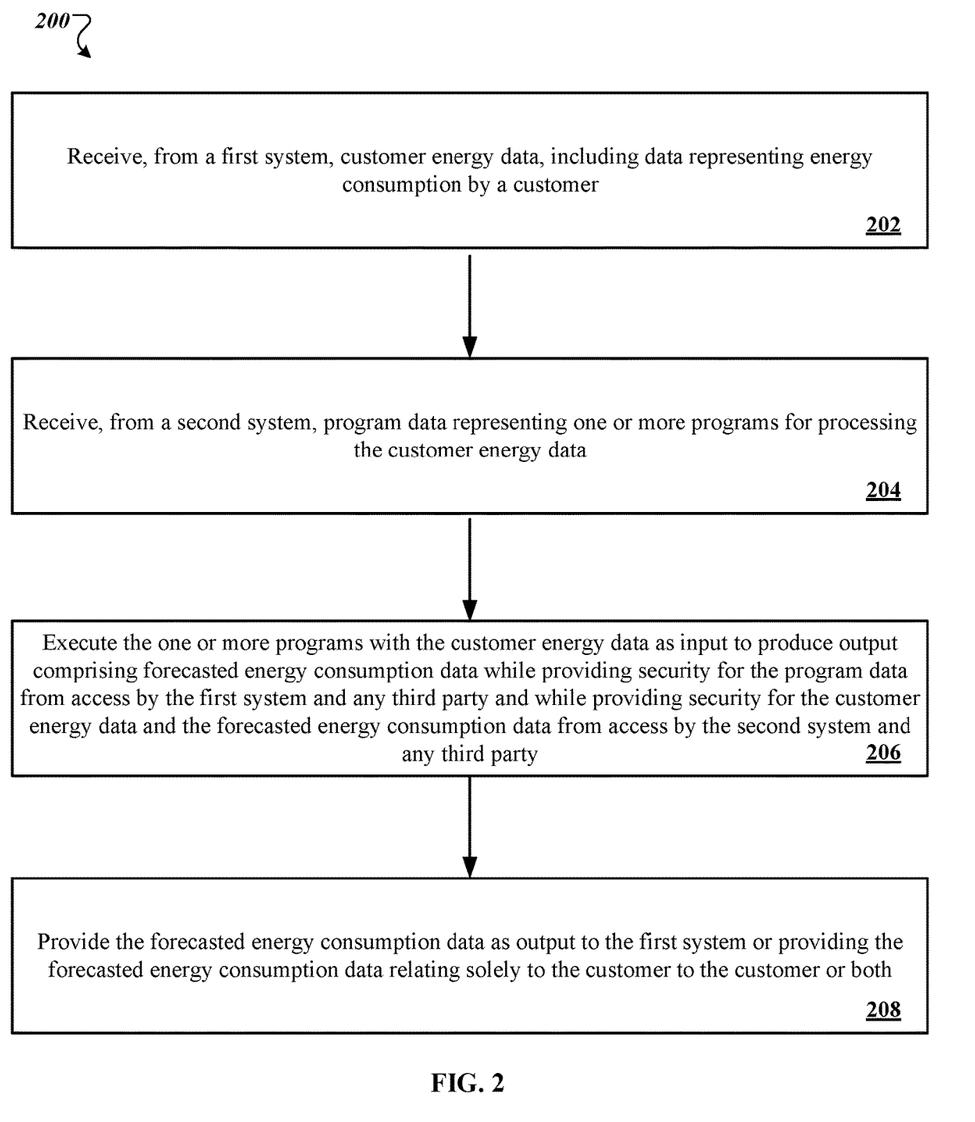
FIG. 2 is a flow diagram that illustrates an example process for processing data between parties while providing mutual security to data and programs.

FIG. 2 is a flow diagram that illustrates an example process 200 for processing data between parties while providing mutual security to data and programs. The process is performed by a system of one or more computers in one or more locations, e.g., one of the systems described above.

The system receives, from a first system, customer energy data, including data representing energy consumption by a customer (202), generally from a retailer. In some implementations, the energy consumption data includes electric energy consumption data of multiple ratepayers. The system can receive the energy consumption data over a particular protocol, e.g., SSH (Secure Shell), SFTP (SSH File Transfer Protocol), or gRPC (gRPC Remote Procedure Call).

The system receives, from a second system, program data representing one or more programs for processing the customer energy data (204). In particular, the system can receive a program or programs from a vendor. In some implementations, the program generates estimated energy consumption and cost data using the energy consumption data provided by the retailer and the characteristics of the consumption equipment and services provided by the vendor.

In some implementations, the system requires the vendor to provide the program in a particular form. For example, the system may require the vendor to provide a program in a domain specific language (DSL) that is supported by the secure execution environment of the system. As a consequence, the program will include only the features necessary to perform the calculations to generate the estimated energy consumption data. By incorporating only features necessary for the anticipated computations, the system offers improved security for a ratepayer's energy consumption data by limiting the possibility of a program leaking ratepayer's energy consumption data to third parties.

The system executes the one or more programs with the customer energy data as input to produce output that includes, or is derived from, estimated energy consumption data, while providing security for the program data from access by the first system and any third party and while providing security for the customer energy data and the estimated energy consumption data from access by the second system and any third party (206). As previously mentioned, the system executes the program in one or more secure execution environments.

The system also provides security for both the first system and the second system. For example, the system prevents the first system from accessing the program data and prevents the second system from accessing the customer energy consumption data or the estimated energy consumption data. Thus, all of the libraries, software components, and hardware components required by the programs to operate must be contained and included within the secure execution environments of the system.

The system provides the output to the first system, or provides the output relating solely to the customer to the customer, or both (208). This can be done electronically or by mail, for example.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

In addition to the embodiments of the attached claims and the embodiments described above, the following numbered embodiments are also innovative:

Embodiment 1 is a method performed by a secure execution system, the method comprising:
receiving, from a first system, customer energy data, including data representing energy consumption by a customer;
receiving, from a second system, program data representing one or more programs for processing the customer energy data;
executing the one or more programs with the customer energy data as input to produce output comprising estimated energy consumption data while providing security for the program data from access by the first system and any third party and while providing security for the customer energy data and the estimated energy consumption data from access by the second system and any third party; and
providing the estimated energy consumption data as output (i) to the first system or (ii) to the customer or (iii) both.

Embodiment 2 is a method of embodiment 1, wherein providing security comprises:
executing the one or more programs in one or more secure execution environments of the secure execution system and controlling by the secure execution system all communications of data and programs into or out of the one or more secure execution environments.

Embodiment 3 is a method of claim 1 or claim 2, further comprising:
receiving, from the first system, encrypted customer energy data;
providing the encrypted customer energy data into the one or more secure execution environments;
decrypting the encrypted customer energy data inside the one or more secure execution environments; and
providing the decrypted customer energy data to the one or more programs in the one or more secure execution environments for execution.

Embodiment 4 is a method of any one of embodiments 1 to 3, further comprising:
receiving, from a third system, rate data; and
providing the rate data to the one or more programs in the one or more secure execution environments to compute a cost of the estimated energy consumption data, wherein a value of the rate data is based on a location of the customer.

Embodiment 5 is a method of any one of embodiments 1 to 4, further comprising:
receiving configuration parameters specified by the second system for performing the programs, wherein the configuration parameters designate one or more hardware or software components for a secure execution system to utilize when the secure execution system executes the configuration parameters of the programs on the customer energy data.

Embodiment 6 is a method of any one of embodiments 1 to 5, wherein the customer energy data comprises a time series of energy data for each of one or more particular customers.

Embodiment 7 is a method of any one of embodiments 1 to 6, further comprising:
determining a size of the customer energy data; and
executing the one or more programs in a number of virtual environments, wherein the number of virtual environments is determined according to the size.

Embodiment 8 is a method of any one of embodiments 1 to 7, wherein:
the customer energy data includes data representing one or more of energy generated by the customer, including any energy provided by the customer to a retailer, or energy consumed by one or more particular kinds of equipment of the customer; and
the estimated energy consumption data relates is calculated for a scenario for a present time period or a past time period, wherein the time period is specified by the program data or by the customer.

Embodiment 9 is one or more computer-readable storage media encoded with instructions that, when executed by one or more computers, cause the one or more computers to perform the operations of any one of embodiments 1 to 8.

Embodiment 10 is a system comprising one or more computers and one or more storage devices on which are stored instructions that are operable, when executed by the one or more computers, to cause the one or more computers to perform the operations of any one of claims 1 to 8.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, from an energy retailer system, energy consumption data for a consumer of the energy retailer system that represents energy consumption by the consumer;
   receiving, from a vendor system, program data that identifies a modification to a system or equipment used by the consumer that interfaces with the energy retailer system,
   executing, based at least on the energy consumption data and the program data, one or more programs in one or more secure execution environments that are restricted from accessing non-volatile memory and that prevent access to the energy consumption data by the vendor system and that prevent access to the program data by the energy retailer system, to generate an output, wherein the output reflects an effect of the modification to the system or the equipment on the energy consumption by the consumer after the modification has been adopted by the consumer; and
   providing the output to the consumer.

2. The method of claim 1, comprising:
   receiving, from the energy retailer system, encrypted energy consumption data;
   providing the encrypted energy consumption data into the one or more secure execution environments;
   decrypting the encrypted energy consumption data inside the one or more secure execution environments; and
   providing the decrypted energy consumption data to the one or more programs in the one or more secure execution environments for execution.

3. The method of claim 1, comprising:
   receiving, from a third system, utility rate data that specifies a rate schedule that applies to the energy consumption by the consumer; and
   providing the utility rate data to the one or more programs in the one or more secure execution environments to compute a cost of estimated energy consumption data, wherein a value of the rate schedule specified by the utility rate data is based on a location of the consumer.

4. The method of claim 1, comprising:
   receiving configuration parameters specified for performing the one or more programs, wherein the configuration parameters designate one or more hardware or software components for a secure execution system to utilize when the one or more secure execution environments execute the configuration parameters of the programs on the energy consumption data.

5. The method of claim 1, wherein the energy consumption data comprises historical energy usage time series data for the consumer.

6. The method of claim 1, comprising:
   determining a size of the energy consumption data; and
   executing the one or more programs in one or more virtual environments, wherein a number of the one or more virtual environments is determined according to the size of the energy consumption data.

7. The method of claim 1, wherein the output comprises estimated energy consumption data, and wherein estimated energy consumption data is calculated for a scenario for a present time period or a past time period, as specified by the program data or by the consumer.

8. The method of claim 1, wherein the modification to the system or the equipment comprises an addition of a new equipment, a new service, or both to the system or the equipment.

9. The method of claim 8, wherein the new equipment, the new service, or both are configured to lower the energy consumption by the consumer.

10. One or more non-transitory computer-readable storage media encoded with instructions that, when executed by one or more computers of a secure execution system, cause the one or more computers to perform operations comprising:
    receiving, from an energy retailer system, energy consumption data for a consumer of the energy retailer system that represents energy consumption by the consumer;
    receiving, from a vendor system, program data that identifies a modification to a system or equipment used by the consumer that interfaces with the energy retailer system;
    executing, based at least on the energy consumption data and the program data, one or more programs in one or more secure execution environments that are restricted from accessing non-volatile memory and that prevent access to the energy consumption data by the vendor system and that prevent access to the program data by the energy retailer system, to generate an output, wherein the output reflects an effect of the modification to the system or the equipment on the energy consumption by the consumer after the modification has been adopted by the consumer; and
    providing the output to the consumer.

11. The storage media of claim 10, wherein the operations comprise:
    receiving, from the energy retailer system, encrypted energy consumption data;
    providing the encrypted energy consumption data into the one or more secure execution environments;
    decrypting the encrypted energy consumption data inside the one or more secure execution environments; and
    providing the decrypted energy consumption data to the one or more programs in the one or more secure execution environments for execution.

12. The storage media of claim 10, wherein the operations comprise:
receiving, from a third system, utility rate data that specifies a rate schedule that applies to the energy consumption by the consumer; and
providing the utility rate data to the one or more programs in the one or more secure execution environments to compute a cost of estimated energy consumption data, wherein a value of the rate schedule specified by the utility rate data is based on a location of the consumer.

13. The storage media of claim 10, wherein the operations comprise:
receiving configuration parameters specified for performing the one or more programs, wherein the configuration parameters designate one or more hardware or software components for a secure execution system to utilize when the one or more secure execution environments execute the configuration parameters of the programs on the energy consumption data.

14. The storage media of claim 10, wherein the energy consumption data comprises historical energy usage time series data for the consumer.

15. The storage media of claim 10, wherein the operations comprise:
determining a size of the energy consumption data; and
executing the one or more programs in one or more virtual environments, wherein a number of the one or more virtual environments is determined according to the size of the energy consumption data.

16. The storage media of claim 10, wherein the output comprises estimated energy consumption data, and wherein estimated energy consumption data is calculated for a scenario for a present time period or a past time period, as specified by the program data or by the consumer.

17. A system comprising:
one or more computers of a secure execution system and one or more storage devices on which are stored instructions that are operable, when executed by the one or more computers, to cause the one or more computers to perform operations comprising:
receiving, from an energy retailer system, energy consumption data for a consumer of the energy retailer system that represents energy consumption by the consumer;
receiving, from a vendor system, program data that identifies a modification to a system or equipment used by the consumer that interfaces with the energy retailer system;
executing, based at least on the energy consumption data and the program data, one or more programs in one or more secure execution environments that are restricted from accessing non-volatile memory and that prevent access to the energy consumption data by the vendor system and that prevent access to the program data by the energy retailer system, to generate an output, wherein the output reflects an effect of the modification to the system or the equipment on the energy consumption by the consumer after the modification has been adopted by the consumer; and
providing the output to the consumer.

18. The system of claim 17, wherein the operations comprise:
receiving, from the energy retailer system, encrypted energy consumption data;
providing the encrypted energy consumption data into the one or more secure execution environments;
decrypting the encrypted energy consumption data inside the one or more secure execution environments; and
providing the decrypted energy consumption data to the one or more programs in the one or more secure execution environments for execution.

19. The system of claim 17, wherein the operations comprise:
receiving, from a third system, utility rate data that specifies a rate schedule that applies to the energy consumption by the consumer; and
providing the utility rate data to the one or more programs in the one or more secure execution environments to compute a cost of estimated energy consumption data, wherein a value of the rate schedule specified by the utility rate data is based on a location of the consumer.

20. The system of claim 17, wherein the operations comprise:
receiving configuration parameters specified for performing the one or more programs, wherein the configuration parameters designate one or more hardware or software components for a secure execution system to utilize when the one or more secure execution environments execute the configuration parameters of the programs on the energy consumption data.

21. The system of claim 17, wherein the energy consumption data comprises historical energy usage time series data for the consumer.

22. The system of claim 17, wherein the operations comprise:
determining a size of the energy consumption data; and
executing the one or more programs in one or more virtual environments, wherein a number of the one or more virtual environments is determined according to the size of the energy consumption data.

* * * * *